(12) United States Patent
Upton (10) Patent No.: US 7,155,007 B1
(45) Date of Patent: Dec. 26, 2006

(54) SYSTEMS AND METHODS FOR REDUCING NOISE IN ADSL TRANSMISSIONS

(75) Inventor: Zachary Michael Upton, Silver Spring, MD (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 782 days.

(21) Appl. No.: 10/184,566

(22) Filed: Jun. 28, 2002

Related U.S. Application Data (60) Provisional application No. 60/369,012, filed on Apr. 1, 2002.

(51) Int. Cl.
*H04M 1/00* (2006.01)
*H04M 9/00* (2006.01)

(52) U.S. Cl. .................................. 379/392.01

(58) Field of Classification Search ........... 379/392.01, 379/1
See application file for complete search history.

(56) References Cited

U.S. PATENT DOCUMENTS 6,741,739 B1 * 5/2004 Vincent ....................... 382/191

OTHER PUBLICATIONS

David L. Donoho et al.; "Threshold Selection for Wavelet Shrinkage of Noisy Data"; Proc. 16th Annual Intl. Conf. Of the IEEE Engineering in Medicine Biology Society; Nov. 1994; pp. 24a-25a.

David L. Donoho; "De-Noising by Soft-Thresholding"; IEEE Trans. On Information Theory; vol. 41, No. 3; May 1995; pp. 613-627.

John W. Cook et al.; "The Noise and Crosstalk Environment for ADSL and VDSL Systems"; IEEE Communications Magazine; May 1999; pp. 73-78.

Kenneth J. Kerpez et al.; "The Error Performance of Digital Subscriber Lines in the Presence of Impulse Noise"; IEEE Transactions on Communications; vol. 43, No. 5; May 1995; pp. 1902-1905.

Jean-Jacques Werner; "The HDSL Environment"; IEEE J. on Selected Areas in Communications; vol. 9, No. 6; Aug. 1991; pp. 785-800.

Jean-Jacques Werner; "Impulse Noise in the Loop Plant"; Communications 1990; ICC-90 including Supercomm Technical Sessions, SUPPERCOMM/ICC '90, Conf. Record; IEEE Intl. Conf. on 1990; vol. 4; pp. 1734-1737.

Robi Polikar, The Wavelet Tutorial Part I; "Fundamental Concepts and an Overview of the Wavelet Theory, Second Edition"; Dept. of Electrical and Computer Engineering; Rowan University; May 31, 2002; 15 pages.

Network and Customer Installation Interfaces—Asymmetric Digital Subscriber Line (ADSL) Metallic Interface, ANSI T1.413-1998 Draft American National Standard for Telecommunications.

* cited by examiner

*Primary Examiner*—Curtis Kuntz
*Assistant Examiner*—Alexander Jamal (57) ABSTRACT

A system (242) processes asymmetric digital subscriber line (ADSL) signals. The system (242) receives a signal that includes an ADSL signal and transient noise (230). The system (242) isolates the transient noise (230) in the signal and retrieves the ADSL signal from the signal using the isolated transient noise (230).

10 Claims, 8 Drawing Sheets

FIG. 8

SYSTEMS AND METHODS FOR REDUCING NOISE IN ADSL TRANSMISSIONS

RELATED APPLICATION

This application claims priority under 35 U.S.C. §119 based on U.S. Provisional Application No. 60/369,012, filed Apr. 1, 2002, the disclosure of which is incorporated herein by reference.

FIELD OF THE INVENTION

The present invention relates generally to communications systems and, more particularly, to systems and methods for detecting and suppressing transient noise in asymmetric digital subscriber line (ADSL) transmissions.

BACKGROUND OF THE INVENTION

The Internet has become an increasingly important part of our everyday lives. Millions of people now access the Internet on a daily basis to shop for goods and services, obtain information of interest (e.g., movie listings), and to communicate with friends, family and co-workers (e.g., via e-mail). This demand for Internet access has created a need for high-speed techniques for transmitting data between homes, businesses, and other institutions. One such technique is ADSL.

Figure 1:
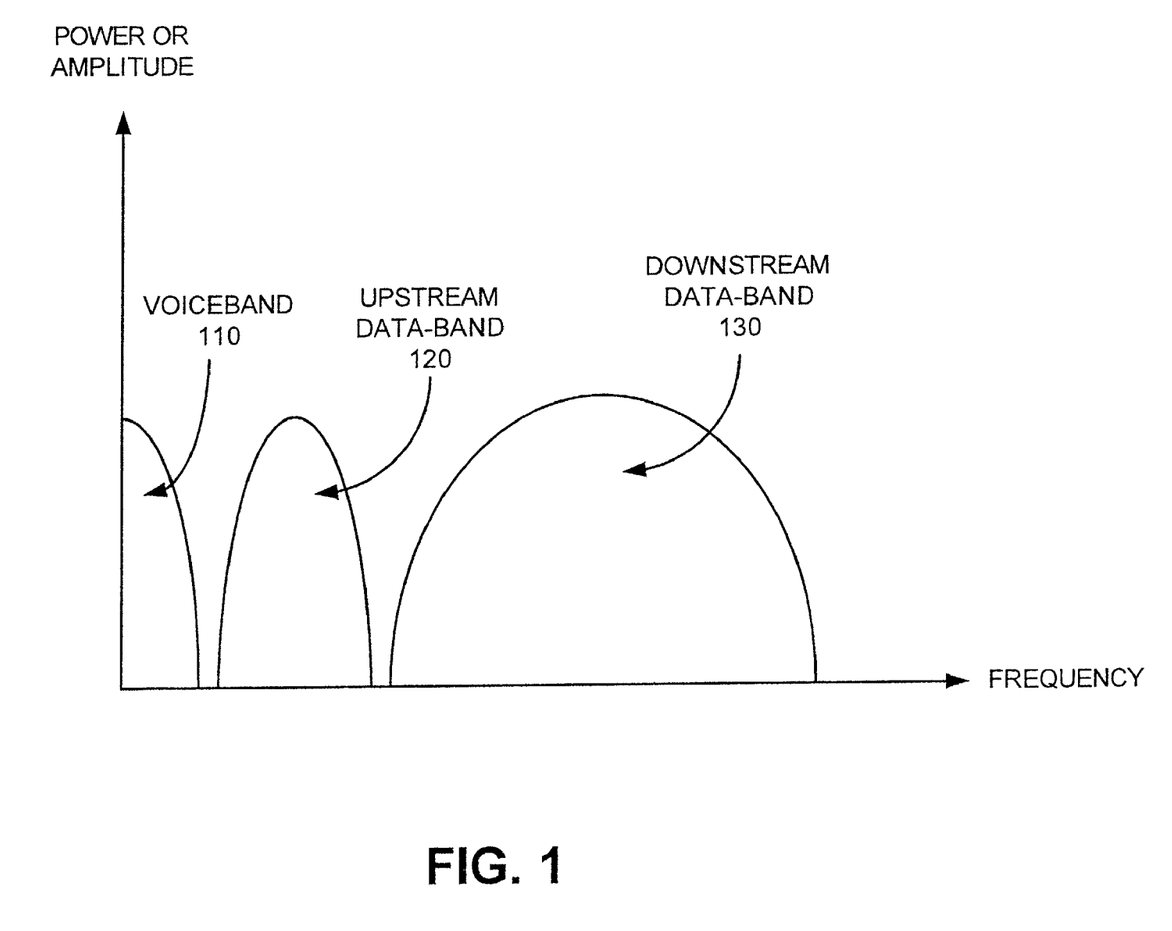
FIG. 1 illustrates the possible division of bandwidth of an ADSL line.

ADSL allows for high-speed data signals and analog voice signals to be simultaneously transmitted and received over existing copper telephone lines. As illustrated in FIG. 1, ADSL divides up the available frequencies in a telephone line into a voiceband portion 110, an upstream data-band portion 120, and a downstream data-band portion 130. The voiceband portion 110 carries analog voice signals between the telephone company's central office and, for example, a customer's residence. The upstream data-band portion 120 carries data to be uploaded to the Internet from the customer's residence. The downstream data-band portion 130 carries data to be downloaded from the Internet to the customer's residence.

The lines carrying the ADSL transmissions to and from a customer's residence or business may be affected by transient noise that may result from bridge taps and line switching. This transient noise may increase the bit error rate of the ADSL transmissions to unacceptable limits. Telephone companies can often predict which lines will be affected by transient noise, but it is difficult to accurately predict transient noise characteristics, such as time of occurrence, rate of occurrence, amplitude in relation to the transmitted signal, duration, and the like. Therefore, it is difficult to eliminate transient noise using conventional telephone hardware and software devices.

As a result, telephone companies would often not use telephone lines that exhibited a great deal of transient noise for those ADSL services that are highly affected by transient noise (e.g., user datagram protocol video). The volume of and demand for ADSL service, however, is ever increasing.

Therefore, there exists a need for systems and methods that are capable of suppressing transient noise in ADSL transmissions.

SUMMARY OF THE INVENTION

Systems and methods consistent with the present invention address this and other needs by providing a mechanism that suppresses transient noise in ADSL transmissions through the use of a multi-scale transformation operation, such as a wavelet transformation operation.

In accordance with the purpose of this invention as embodied and broadly described herein, a method for processing ADSL signals is provided. The method includes receiving a signal including an ADSL signal and noise, applying a wavelet transform operation to the signal, applying a threshold to the wavelet transformed signal, discarding a portion of the wavelet transformed signal at or below the threshold to obtain a resulting signal, applying an inverse wavelet transform operation to the resulting signal to obtain a replica signal corresponding to the noise, and subtracting the replica signal from the received signal to obtain the ADSL signal.

In another implementation consistent with the present invention, a method for processing an ADSL signal is provided. The method includes receiving a signal including an ADSL signal and transient noise, isolating the transient noise in the signal, and retrieving the ADSL signal from the signal using the isolated transient noise.

In yet another implementation consistent with the present invention, a system for processing an ADSL signal is provided. The system includes logic configured to receive a signal including an ADSL signal and transient noise, logic configured to isolate the transient noise in the signal using a multi-scale transformation operation, and logic configured to obtain the ADSL signal from the signal using the isolated transient noise.

In still another implementation consistent with the present invention, a system for processing an ADSL signal is provided. The system includes logic configured to receive a signal including an ADSL signal and noise and logic configured to suppress the noise in the signal using a wavelet transformation operation.

In a further implementation consistent with the present invention, a noise suppression device includes first logic, second logic, and third logic. The first logic receives a signal including an ADSL signal and noise. The second logic isolates the noise in the received signal. The third logic subtracts the isolated noise from the received signal to obtain the ADSL signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the present invention suppress noise in ADSL transmissions. Through the use of wavelet techniques, transient noise added to ADSL transmissions may be detected and suppressed to thereby reduce the number of bit errors present in the ADSL transmissions without adding significant latency to the transmissions.

Exemplary System

Figure 2:
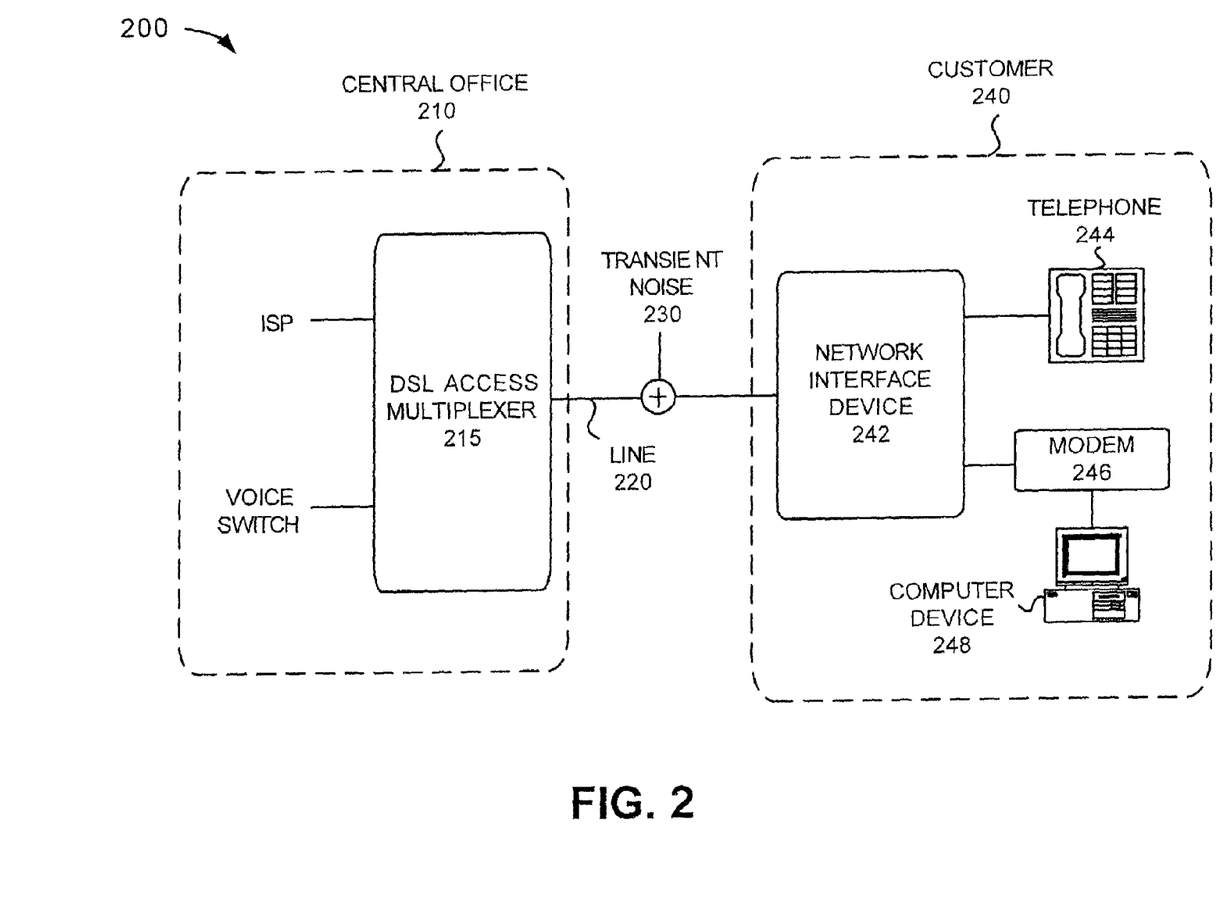
FIG. 2 illustrates an exemplary system in which systems and methods consistent with the present invention may be implemented.

FIG. 2 illustrates a portion of an exemplary system 200 in which systems and methods, consistent with the present invention, may be implemented. System 200 includes a central office 210 connected to a customer's premises 240 via an ADSL line 220.

Central office 210 may include a conventional local telephone company switching center that receives and directs telephone calls and ADSL data transmissions to their appropriate destinations. While central office 210 is illustrated as being connected to a single customer 240, a typical central office 210 may be connected to multiple customers 240.

Central office 210 may include a DSL access multiplexer 215 that receives data signals from, for example, an Internet Service Provider (ISP) and voice signals from, for example, a telephone voice switch, multiplexes the signals, and transmits the multiplexed signals to customer 240 via ADSL line 220. It will be appreciated that central office 210 may also include a modulator (not shown) that modulates the signals prior to transmission.

ADSL line 220 may include any transmission medium capable of transporting broadband ADSL signals to customer 240. ADSL line 220 may, for example, include one or more conventional copper telephone lines or other similar types of transmission media.

It will be appreciated that in some instances, traffic transmitted via ADSL line 220 may be affected by transient noise 230, resulting in corrupt signals containing a mixture of ADSL signals and transient noise. This transient noise 230 may come from a variety of sources, such as bridge taps, line switching, etc.

Customer 240 may include a network interface device 242, a telephone device 244, a modem 246, and a computer device 248. Network interface device 242 receives the corrupt signals (i.e., the signals resulting after transient noise 230 has been added to the broadband ADSL signals transmitted from central office 210) via line 220, suppresses the transient noise in the corrupt signals, separates the signals in the voiceband range from the signals in the data-band range, and transmits these signals to the appropriate device(s). For example, network interface device 242 may transmit the signals in the voiceband range to one or more telephone devices, such as telephone device 244, and the signals in the data-band range to one or more modems, such as modem 246.

Telephone device 244 may include one or more devices capable of transmitting and/or receiving analog voice communications, a facsimile device, or the like. Telephone device 244 may, for example, include a plain old telephone system (POTS) telephone. Modem 246 may include one or more devices capable of demodulating the ADSL data signals received by network interface device 242. Modem 246 may, for example, include one or more conventional ADSL modems. Computer device 248 may include one or more devices capable of transmitting and/or receiving data communications. Computer device 248 may include, for example, a personal computer, a laptop, or the like.

The particular components illustrated in FIG. 2 have been shown for simplicity. It will be appreciated that a typical system may include more or fewer components than illustrated in FIG. 2. Moreover, it will be appreciated that central office 210 and customer 240 may include additional or different devices than those illustrated in FIG. 2 that aid in the reception, processing, and/or transmission of signals.

Figure 3:
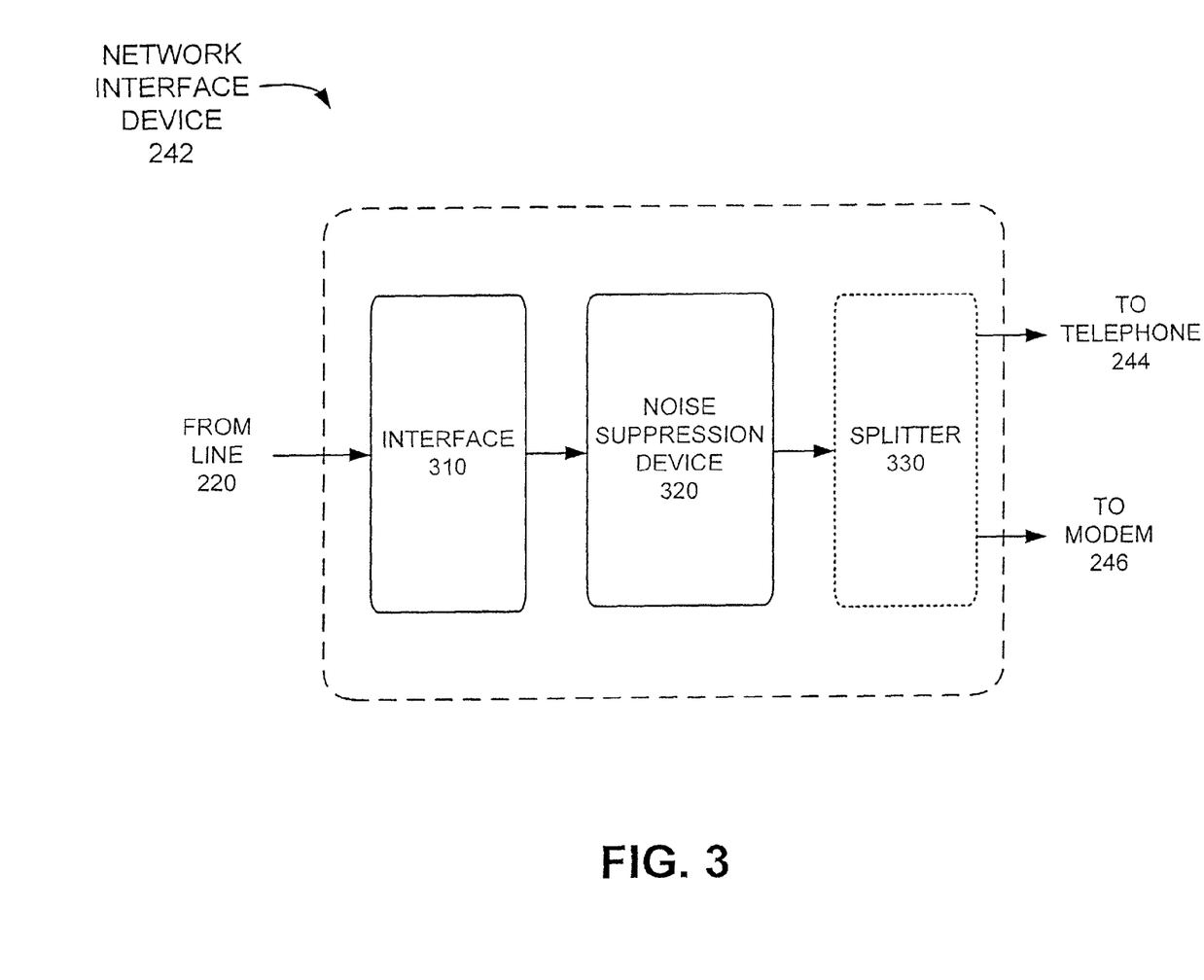
FIG. 3 illustrates an exemplary configuration of the network interface device of FIG. 2.

FIG. 3 illustrates an exemplary configuration of network interface device 242 of FIG. 2 in an implementation consistent with the present invention. As illustrated, network interface device 242 may include an interface 310, a noise suppression device 320, and an optional splitter 330. It will be appreciated that implementations consistent with the present invention are equally applicable to splitterless environments. In a splitterless environment, an RJ11 filter (or some other similar type of filter) may be used to separate the analog voice signals in the ADSL transmission from the data signals. It will be further appreciated that network interface device 242 may include additional devices than those illustrated in FIG. 3 that aid in receiving, processing, and/or transmitting signals.

Interface 310 temporarily stores corrupt signals received via line 220 and passes the corrupt signals to noise suppression device 320. Noise suppression device 320 receives the corrupt signals from interface 310 and suppresses transient noise 230 in the corrupt signals in order to regain the original ADSL signals transmitted by central office 210. Noise suppression device 320 may include logic for performing functional operations, such as suppressing noise in received corrupt signals, as described below. This logic may include hardware, such as an application specific integrated circuit or a field programmable gate array, software, or a combination of hardware and software.

Splitter 330 may receive the broadband ADSL signals from noise suppression device 320 and separate the analog voice signals from the data signals and routes these signals to the appropriate device(s). For example, splitter 330 may route analog voice signals to telephone 244 and data signals to modem 246.

Exemplary Processing

Historically, wavelet techniques have been used in image and signal processing for numerous applications. Specifically, wavelet algorithms have been designed and widely used to remove broadband noise from signals, leaving behind desired transient features. Exemplary implementations consistent with the present invention apply these "de-noising" techniques in reverse, suppressing the interfering transient noise and leaving behind the desired broadband ADSL signal.

Figure 4:
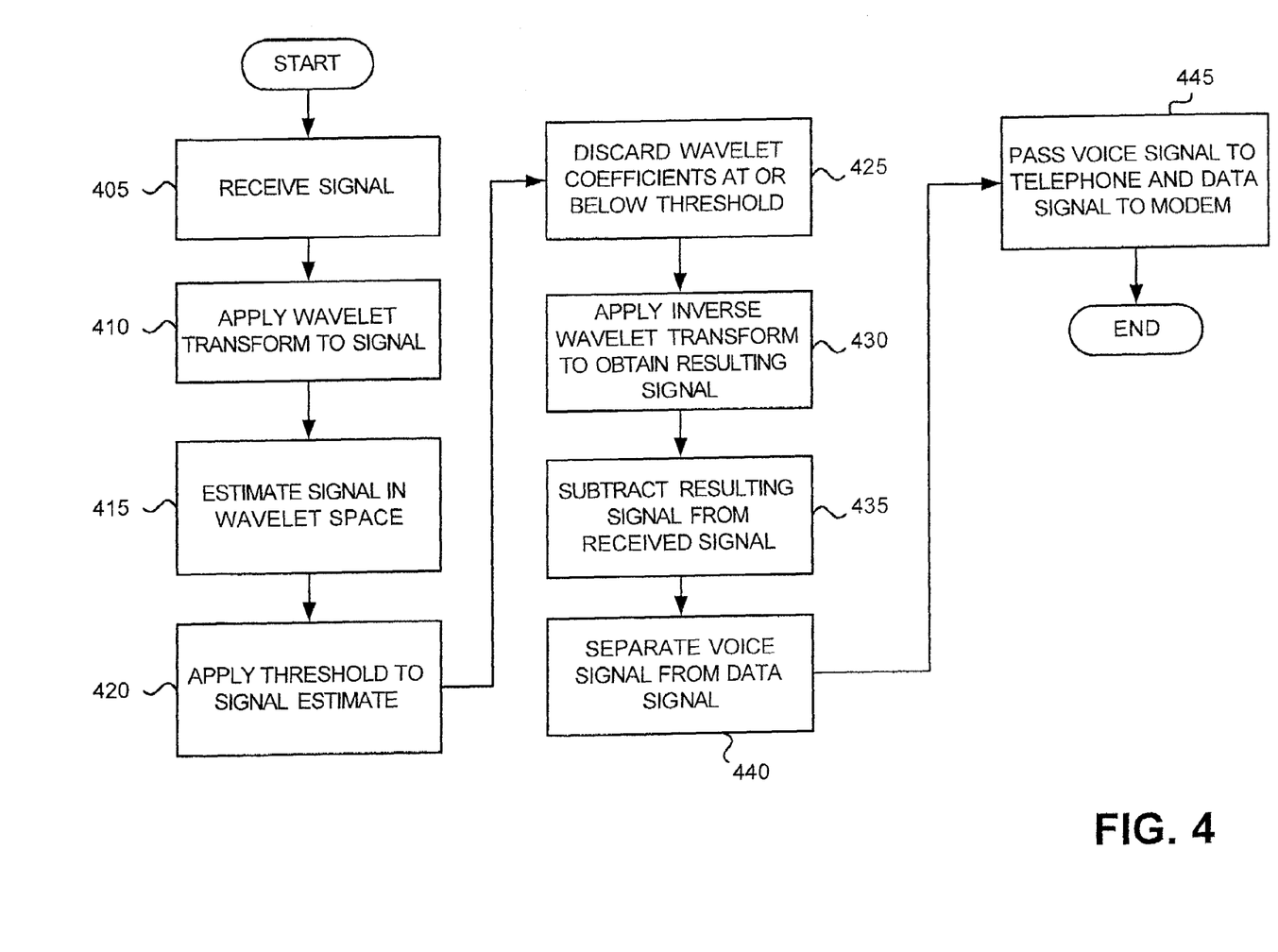
FIG. 4 illustrates an exemplary process for routing ADSL signals in an implementation consistent with the present invention.

FIG. 4 illustrates an exemplary process for routing ADSL signals in an implementation consistent with the present invention. Processing may begin with network interface device 242 receiving a corrupt signal from central office 210 via line 220 [act 405]. As described above, the corrupt signal includes the broadband ADSL signal transmitted by central office 210 combined with some type of transient noise 230. The corrupt signal may be represented as follows:

$$x[i]=s[i]+n[i],$$

where s[i] represents the signal of interest (i.e., the broadband ADSL signal) and n[i] represents transient noise 230.

Network interface device 242 may then apply a wavelet transform to the corrupt signal [act 410]. The wavelet transform breaks up the corrupt signal into a series of scale space representations by correlating the signal with quadrature mirror filters based on a series of dilated or compressed wavelets. It will be appreciated that the wavelet transform compresses transient energy into relatively few wavelet coefficients while the broadband ADSL signal is generally spread evenly across the wavelet bases. Taking the wavelet transform of the corrupt signal yields:

$$X_w[k]=W\{x[i]\}=S_w[k]+N_w[k],$$

where W{ } represents the wavelet transform operation and $S_w[k]$ and $N_w[k]$ represent the wavelet transform of the signal and noise components, respectively.

Network interface device 242 may estimate the corrupt signal as:

$$\text{Signal} = \frac{\sum_{\frac{n}{2}+1}^{n} \left| \frac{X_w n}{0.6745} \right|}{n},$$

where n represents the number of frequency bins for the broadband ADSL transmission [act 415]. Network interface device 242 may then apply a hard threshold to $X_w$ at a point above the estimated signal level [act 420]. The threshold may, for example, be set using:

$$\tau = A^* \text{Signal}^* \sqrt{2\log(n)},$$

where A is a constant optimized for the basis set used in the wavelet transform. Based on the hard threshold τ, network interface device 242 may consider all values of $X_w$ above the threshold τ as transient noise 230.

Network interface device 242 discards all wavelet coefficients that are equal to or below the threshold τ [act 425]. That is, network interface device 242 discards the wavelet coefficients relating to the broadband ADSL signal, thereby leaving those wavelet coefficients (i.e., those above the threshold τ) that correspond to transient noise 230. Network interface device 242 may then apply an inverse wavelet transform to the remaining group of wavelet coefficients [act 430]. The resulting signal is a replica of the transient noise 230 added to the broadband ADSL signal as it was transmitted over line 220.

Network interface device 242 may subtract the resulting signal from the original received signal (i.e., the received corrupt signal) to obtain a replica of the original broadband ADSL signal that was transmitted by central office 210 [act 435]. In this manner, network interface device 242 may suppress transient noise 230 in a received corrupted signal. It will be appreciated that the above-described processing may be performed on ADSL transmissions without adding significant latency.

Network interface device 242 may separate the analog voice signal from the data signal in the broadband ADSL signal in a well-known manner [act 440] and pass the analog voice signal and data signal on to the appropriate device [act 445]. For example, network interface device 242 may pass the voice signal to a telephone device, such as telephone 244, and the data signal to a modem, such as modem 246.

Figure 5:
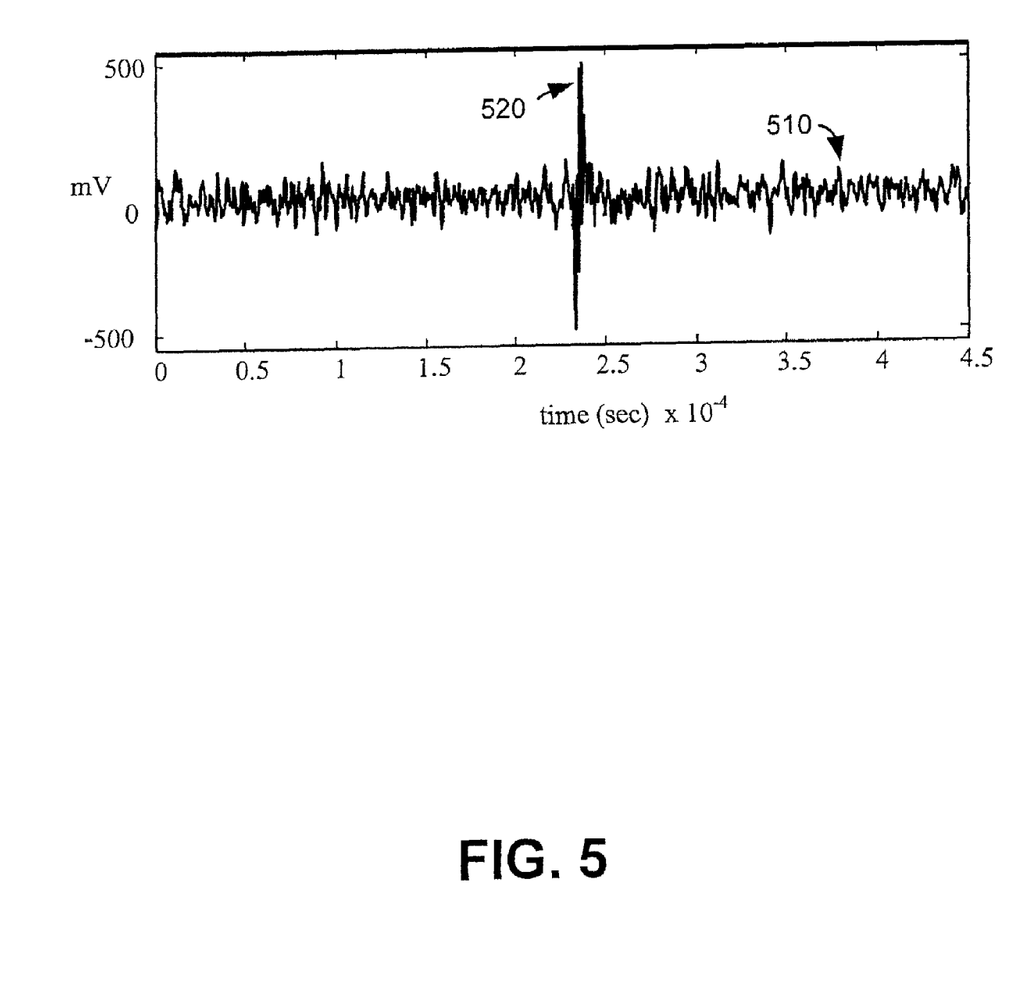
FIG. 5 illustrates and exemplary corrupt signal that may be received by the network interface device of FIG. 2.
Figure 6:
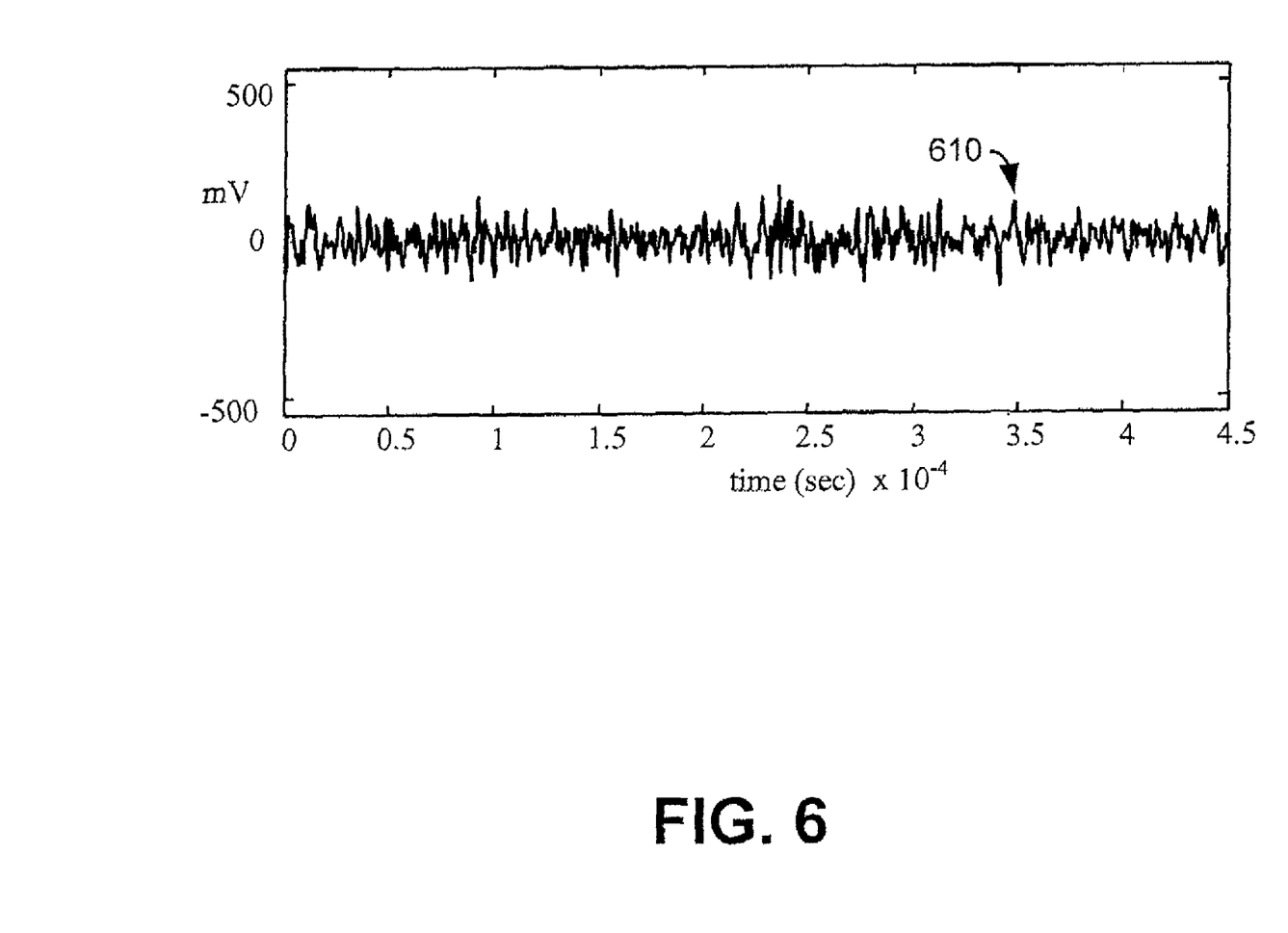
FIG. 6 illustrates the signal of FIG. 5 after applying noise suppression processing consistent with the principles of the present invention.

FIG. 5 illustrates an exemplary corrupt signal 510 that may be received by network interface device 242. As illustrated, the spike 520 occurring at approximately the 0.24 millisecond mark is a result of transient noise being added to the broadband ADSL signal. FIG. 6 illustrates a signal 610, which is the signal 510 of FIG. 5 after application of the noise suppression operation of the present invention. In this implementation, A was set to 1.2. The number of frequency bins for the ADSL signal transmission was 256. As evident from signal 610 illustrated in FIG. 6, the noise suppression processing of the present invention effectively removes transient noise added to a signal transmitted over an ADSL line.

To quantify the performance of the above-described processing, line qualification tests from ANSI T1.413 were modified. In this case, two random blocks of ADSL data were corrupted with T1.413 simulated transients. The level of the transient with respect to the ADSL signal was varied from −2 dB to 10 dB. At each transient level, the above-described processing was applied to 20 different ADSL signals (corrupted with a transient). The original and wavelet processed signals were decoded and the bit error rate for both signals was measured. The bit error rate (BER) may be defined as:

$$\text{BER} = \frac{\text{\# of Bit Errors}}{\text{Total \# of Bits}}.$$

Figure 7:
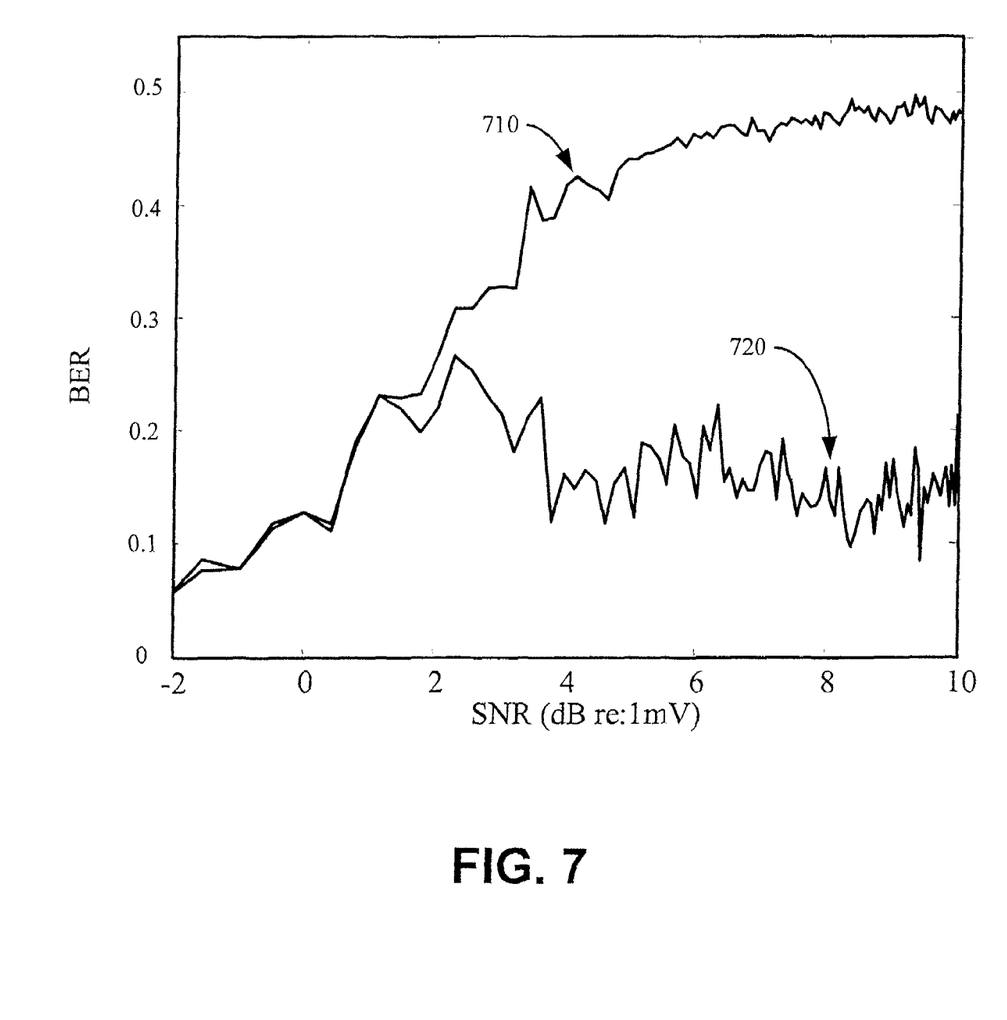
FIGS. 7 and 8 illustrate graphs of bit error rate versus the ratio of ADSL signal level to transient noise level in an exemplary implementation consistent with the present invention.
Figure 8:
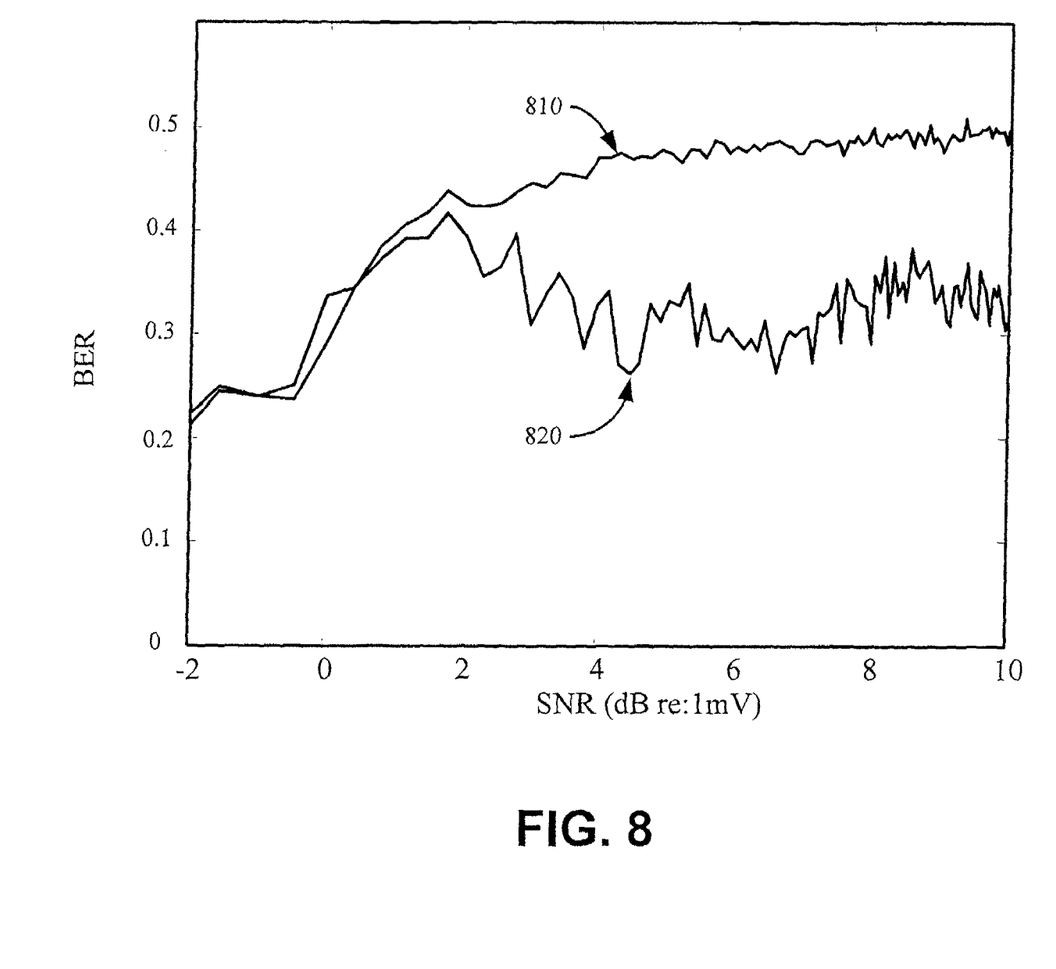

Graphs of the BER versus the ration of ADSL signal level to transient noise level (SNR) for two ANSI T1.413 transients are illustrated in FIGS. 7 and 8. Each point in the graph represents the average BER of 20 iterations. In FIG. 7, line 710 represents an unprocessed signal corrupted by sample transient number 1 from ANSI T1.413 and line 720 represents the signal 710 after application of noise suppression processing consistent with the principles of the present invention. Similarly in FIG. 8, line 810 represents an unprocessed signal corrupted by sample transient number 2 from ANSI T1.413 and line 820 represents the signal 810 after application of noise suppression processing consistent with the principles of the present invention. It is evident from the graphs in FIGS. 7 and 8 that significant improvement in BER is possible using noise suppression processing consistent with the present invention. For example, as evident from FIG. 7, greater than 60% improvement in BER is possible using the above-described noise suppression processing.

CONCLUSION

Systems and methods consistent with the present invention suppress transient noise in ADSL transmissions through the use of wavelet techniques. By using wavelet techniques, transient noise added to ADSL transmissions may be detected and suppressed to thereby reduce the number of bit errors in the ADSL transmissions without adding significant latency.

The foregoing description of exemplary embodiments of the present invention provides illustration and description, but is not limited to be exhaustive or to limit the invention to the precise form disclosed. Modifications and variations are possible in light of the above teachings or may be acquired from practice of the invention. For example, while the above description focused on the use of wavelet processing for performing noise suppression, the present invention is not so limited. Other multi-scale transformation operations may alternatively be used.

Additionally, the above description described the network interface device as performing noise suppression processing consistent with the present invention. It will be appreciated that the noise suppression processing may be performed by another device at the customer's premises. Moreover, the central office may also perform noise suppression processing consistent with the present invention on traffic received from the customer.

The above implementations can be implemented in software, hardware, or a combination of software and hardware. Thus, the present invention is not limited to any specific combination of hardware circuitry and software.

While a series of acts has been described with regard to FIG. 4, the order of the acts may be varied in other implementations consistent with the present invention. Moreover, non-dependent acts may be implemented in parallel. No element, act, or instruction used in the description of the present application should by construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for processing asymmetric digital subscriber line (ADSL) signals, comprising:
   receiving a signal comprising a continuous ADSL signal and transient noise;
   applying a wavelet transform operation to the received signal;
   estimating the signal level in wavelet space by way of the equation $$\text{Signal} = \frac{\sum_{\frac{n}{2}+1}^{n} \left| \frac{X_w n}{0.6745} \right|}{n},$$

where "n" represents number of frequency bins for the continuous ADSL signal and $x_w$ is value of the wavelet transform of the received signal;
   using the signal level estimate to determine an amplitude threshold;
   applying the amplitude threshold to the wavelet transformed signal;
   discarding a portion of the wavelet transformed signal at or below the threshold to obtain a resulting signal;
   applying an inverse wavelet transform operation to the resulting signal to obtain a replica signal corresponding to the noise; and
   subtracting the replica signal from the received signal to obtain the ADSL signal.

2. A method for processing an asymmetric digital subscriber line (ADSL) signal, comprising:
   receiving the signal comprising a continuous ADSL signal and transient noise;
   isolating the transient noise in the signal by:
      applying wavelet processing to the signal to obtain a wavelet processed signal,
      estimating the signal level in wavelet space by way of the equation $$\text{Signal} = \frac{\sum_{\frac{n}{2}+1}^{n} \left| \frac{X_w n}{0.6745} \right|}{n},$$

where "n" represents number of frequency bins for the continuous ADSL signal and $x_w$ is value of the wavelet transform of the received signal,
      using the signal level estimate to determine an amplitude threshold,
      applying the amplitude threshold to the wavelet processed signal,
      discarding a portion of the wavelet processed signal at or below the threshold to obtain a resulting signal, and
      applying inverse wavelet processing to the resulting signal to obtain the isolated transient noise; and
   retrieving the continuous ADSL signal from the signal using the isolated transient noise.

3. The method of claim 2 wherein the retrieving includes: subtracting the isolated transient noise from the signal.

4. The method of claim 2 further comprising:
   separating the retrieved ADSL signal into a voice signal and a data signal.

5. A system for processing asymmetric digital subscriber line (ADSL) signals, comprising:
   means for receiving one or more signals, each one of the one or more signals comprising a continuous ADSL signal and transient noise;
   means for detecting the noise in the one or more signals including:
      means for applying wavelet transform processing to the signal to produce a plurality of wavelet coefficients,
      means for estimating the signal level in wavelet space by way of:

$$\text{Signal} = \frac{\sum_{\frac{n}{2}+1}^{n} \left| \frac{X_w n}{0.6745} \right|}{n},$$

where "n" represents number of frequency bins for the continuous ADSL signal and $x_w$ is value of a wavelet transform of one of the one or more received signals,
      means for using the signal level estimate to determine an amplitude threshold, and
      means for comparing the plurality of wavelet coefficients to the amplitude threshold; and
   means for retrieving the continuous ADSL signal from each one of the one or more signals using the detected noise.

6. The system of claim 5 wherein the means for detecting further includes:
   means for discarding one or more of the plurality of wavelet coefficients at or below the threshold to obtain a resulting set of wavelet coefficients, and
   means for applying inverse wavelet transform processing to the resulting set of wavelet coefficients to detect the noise.

7. A system for processing an asymmetric digital subscriber line (ADSL) signal, comprising:
   logic configured to receive the signal comprising a continuous ADSL signal and transient noise;

logic configured to isolate the transient noise in the signal using a multi-scale transformation operation by being configured to
apply wavelet processing to the signal to obtain a wavelet processed signal,
estimate the signal level in wavelet space by way of the equation $$Signal = \frac{\sum_{\frac{n}{2}+1}^{n}\left|\frac{X_w n}{0.6745}\right|}{n},$$

where "n" represents number of frequency bins for the continuous ADSL signal and $x_w$ is value of the wavelet transform of the signal,
use the signal level estimate to determine an amplitude threshold,
apply the amplitude threshold to the wavelet processed signal,
discard a portion of the wavelet processed signal at or below the threshold to obtain a resulting signal, and
apply inverse wavelet processing to the resulting signal to obtain the isolated transient noise; and
logic configured to obtain the continuous ADSL signal from the signal using the isolated transient noise.

8. The system of claim 7 wherein the logic configured to obtain the ADSL signal is configured to:
subtract the isolated transient noise from the signal.

9. A system for processing an asymmetric digital subscriber line (ADSL) signal, comprising:
logic configured to receive the signal comprising a continuous ADSL signal and transient noise; and
logic configured to suppress the noise in the signal using a wavelet transformation operation including:
logic configured to isolated the noise by: (1) applying wavelet processing to the signal to obtain a wavelet processed signal, (2) estimating the signal level in wavelet space, (3) using the signal level estimate to determine an amplitude threshold, (4) applying the amplitude threshold to the wavelet processed signal, (5) discarding a portion of the wavelet processed signal at or below the threshold to obtain a resulting signal, and (6) applying inverse wavelet processing to the resulting signal to obtain the isolated noise; and
logic configured to subtract the isolated noise from the signal to retrieve the continuous ADSL signal;

wherein the logic for estimating signal level in wavelet space relies on the equation $$Signal = \frac{\sum_{\frac{n}{2}+1}^{n}\left|\frac{X_w n}{0.6745}\right|}{n},$$

where "n" represents number of frequency bins for the continuous ADSL signal and $x_w$ is value of the wavelet transform of the received signal.

10. A noise suppression device comprising:
first logic configured to receive a signal comprising a continuous asymmetric digital subscriber line (ADSL) signal and transient noise;
second logic configured to isolate the noise in the received signal wherein, when isolating the noise, the second logic is configured to:
apply wavelet processing to the received signal to obtain a wavelet processed signal,
estimate the signal level in wavelet space by way of the equation $$Signal = \frac{\sum_{\frac{n}{2}+1}^{n}\left|\frac{X_w n}{0.6745}\right|}{n},$$

where "n" represents number of frequency bins for the continuous ADSL signal and $x_w$ is value of the wavelet transform of the received signal,
use the signal level estimate to determine an amplitude threshold,
apply the amplitude threshold to the wavelet processed signal,
discard a portion of the wavelet processed signal at or below the threshold to obtain a resulting signal, and
apply inverse wavelet processing to the resulting signal to obtain the isolated noise; and
third logic configured to subtract the isolated noise from the received signal to obtain the continuous ADSL signal.

* * * * *